United States Patent
McKenney

(10) Patent No.: US 7,844,802 B2
(45) Date of Patent: *Nov. 30, 2010

(54) INSTRUCTIONS FOR ORDERING EXECUTION IN PIPELINED PROCESSES

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 50 days.

This patent is subject to a terminal disclaimer.

(21) Appl. No.: 12/145,204

(22) Filed: Jun. 24, 2008

(65) Prior Publication Data

US 2008/0263337 A1     Oct. 23, 2008

Related U.S. Application Data

(63) Continuation of application No. 09/816,796, filed on Mar. 23, 2001, now Pat. No. 7,398,376.

(51) Int. Cl.
    G06F 7/38    (2006.01)
    G06F 9/00    (2006.01)
    G06F 9/44    (2006.01)

(52) U.S. Cl. .................. 712/225; 717/151; 717/159; 717/149

(58) Field of Classification Search ............... 712/225; 711/151, 159, 149
    See application file for complete search history.

(56) References Cited

U.S. PATENT DOCUMENTS

| | | |
|---|---|---|
| 5,117,350 A | 5/1992 | Parrish et al. |
| 5,526,495 A | 6/1996 | Shibata et al. |
| 5,592,625 A | 1/1997 | Sandberg |
| 5,625,832 A | 4/1997 | Ohsawa et al. |
| 5,749,095 A | 5/1998 | Hagersten |
| 5,761,474 A | 6/1998 | Lesartre et al. |
| 5,850,632 A * | 12/1998 | Robertson .................. 711/170 |
| 5,889,974 A | 3/1999 | Harriman et al. |

(Continued)

FOREIGN PATENT DOCUMENTS

JP     04-060743     2/1992

(Continued)

OTHER PUBLICATIONS

Gharachorloo et al., "Memory consistency and event ordering in scalable shared-memory multiprocessor", 1990.*

*Primary Examiner*—Chun-Kuan Lee
*Assistant Examiner*—Jesse R Moll
(74) *Attorney, Agent, or Firm*—Lieberman & Brandsdorfer, LLC

(57) ABSTRACT

Ordering instructions for specifying the execution order of other instructions improve throughput in a pipelined multiprocessor. Memory write operations local to a CPU are allowed to occur in an arbitrary order, and constraints are placed on shared memory operations. Multiple sets of instructions are provided in which order of execution of the instructions is maintained through the use of CPU registers, write buffers in conjunction with assignment of sequence numbers to the instruction, or a hierarchical ordering system. The system ensures that an earlier designated instruction has reach a specified state of execution prior to a latter instruction reaching a specified state of execution. The ordering of operations allows memory operations local to a CPU to occur in conjunction with other memory operations that are not affected by such execution.

14 Claims, 4 Drawing Sheets

U.S. PATENT DOCUMENTS

| | | |
|---|---|---|
| 5,898,853 A | 4/1999 | Panwar et al. |
| 5,913,925 A | 6/1999 | Kahle et al. |
| 5,941,983 A | 8/1999 | Gupta et al. |
| 5,958,019 A | 9/1999 | Hagerston et al. |
| 6,108,737 A | 8/2000 | Sharma et al. |

FOREIGN PATENT DOCUMENTS

| | | |
|---|---|---|
| JP | 09-044460 | 2/1997 |
| JP | 2001043203 | 2/2001 |

* cited by examiner

INSTRUCTIONS FOR ORDERING EXECUTION IN PIPELINED PROCESSES

CROSS REFERENCE TO RELATED APPLICATION(S)

The present application is a continuation of U.S. patent application Ser. No. 09/816,796 filed on Mar. 23, 2001, now pending, which is hereby incorporated by reference.

BACKGROUND OF THE INVENTION

1. Technical Field

This invention relates to pipelining processes in a multiprocessor computing environment. More specifically, the invention relates to a method and system for improving throughput based upon ordering constraints for shared memory operations.

2. Description of the Prior Art

Multiprocessor systems contain multiple processors (also referred to herein as CPUs) that can execute multiple processes or multiple threads within a single process simultaneously in a manner known as parallel computing. In general, multiprocessor systems execute multiple processes or threads faster than conventional single processor systems, such as personal computer, that execute programs sequentially. The actual performance advantage is a function of a number of factors, including the degree to which parts of a multithreaded process and/or multiple distinct processes can be executed in parallel and the architecture of the particular multiprocessor system. The degree to which processes can be executed in parallel depends, in part, on the extent to which they compete for exclusive access to shared memory resources.

Shared memory multiprocessor systems offer a common physical memory address space that all processors can access. Multiple processes therein, or multiple threads within a process, can communicate through shared variables in memory which allow the processes to read or write to the same memory location in the computer system. In order to increase operating efficiency in a multiprocessor system it is important to increase the speed by which a processor executes a program. One way to achieve this goal is to execute more than one operation at the same time. This approach is generally referred to as parallelism. A known technique for supporting parallel programming and to manage memory access operations in a multiprocessor is pipelining. Pipelining is a technique in which the execution of an operation is partitioned into a series of independent, sequential steps called pipeline segments. Each segment in the pipeline completes a part of an instructions, and different segments of different instructions may operate in parallel. Accordingly, pipelining is a form of instruction level parallelism that allows more than one operation to be processed in a pipeline at a given point in time.

In a cache-coherent system, multiple processors see a consistent view of memory. Several memory-consistency models may be implemented. The most straightforward model is called sequential consistency. Sequential consistency requires that the result of any execution be the same as if the accesses executed by each processor were kept in order and the accesses among different processors were interleaved. The simplest way to implement sequential consistency is to require a processor to delay the completion of any memory access. However, sequential consistency is generally inefficient. FIGS. 1 a-c outline the process of adding a new element 30 to a data structure 5 in a sequential consistency model. FIG. 1a is an illustration of a sequential consistency memory model for a data structure prior to adding or initializing a new element 30 to the data structure 5. The data structure 5 includes a first element 10 and a second element 20. Both the first and second elements 10 and 20, respectively, have three fields 12, 14 and 16, and 22, 24 and 26. In order to add a new element 30 to the data structure 5 such that the CPUs in the multiprocessor environment could concurrently search the data structure, the new element 30 must first be initialized. This ensures that CPUs searching the linked data structure do not see fields in the new element filled with corrupted data. Following initialization of the new element's 30 fields 32, 34 and 36, the new element may be added to the data structure 5. FIG. 1b is an illustration of the new element 30 following initialization of each of it's fields 32, 34 and 36, and prior to adding the new element 30 to the data structure 5. Finally, FIG. 1c illustrates the addition of the third element to the data structure following the initialization of the fields 32, 34 and 36. Accordingly, in a sequential consistency memory model execution of each step in the process must occur in a pre-specified order.

The process of FIGS. 1a-c is only effective on CPUs that use a sequentially consistent memory model. For example, the sequential memory model may fail in weaker memory models where other CPUs may see write operations from a given CPU happening in different orders. FIG. 2 is an illustration of a weak memory-consistency model for adding a new element to a data structure. In this example, the write operation to the new element's 30 first field 32 passes the write operation to the second element's 20 next field 22. A CPU searching the data structure may see the first field 32 of the third element 30, resulting in corrupted data. The searching CPU may then attempt to use the data ascertained from the field 32 as a pointer, and most likely this would result in a program failure or a system crash. Accordingly, it is desirable to place some form of a memory barrier instruction to be executed prior to storing a pointer from the second element in the data structure to the new element in the data structure.

FIG. 3 is a block diagram 40 illustrating the segregation of instructions into groups, wherein one group of instructions occurs before the memory barrier and another group of instructions occurs after the memory barrier. This diagram follows the linked data structure example of FIGS. 1 and 2. There are essentially four levels of operation. The first level includes the following operations: storing a NULL pointer into the new element's first field 42, storing the character string "IJKL" into the new element's second field 44, and storing the number "9012" into the new elements third field 46. Following this group of write operations, a memory barrier 50 is executed. The memory barrier ensures that each of the write operations 42, 44 and 46 occur prior to any other computations. Following the execution of the memory barrier 50 and the execution of the write operations 42, 44 and 46, the address of the second element may be computed 52. Step 52 is a local memory operation, and it may involve a plurality of write operations to the CPUs local memory. Finally, following step 52, a pointer to the new element is stored in the second element's first field 54. Although the memory barrier instruction 50 prevents the memory write operations 42, 44 and 46 from appearing to have occurred later than memory write operation at 54, it needlessly prevents the write operations in 42, 44 and 46 from appearing to have occurred later than computation of address 52. Accordingly, the prior uses of memory barrier instructions as shown in FIG. 3 results in an inefficient use of the CPU's resources resulting in a delayed execution of the program.

FIG. 4 is a block diagram 60 similar to the example shown in FIG. 3 without the memory barrier instruction. This diagram follows the linked data structure example of FIGS. 1 and 2. In this example, the memory barrier instruction 50 is removed, and as such there are two levels of operation. The first level includes the following operations: storing a NULL pointer into the new element's first field 42, storing the character string "IJKL" into the new element's second field 44, and storing the number "9012" into the new elements third field 46. Following the write operations of 42, 44 and 46, the address of the second element may be computed 52. At the same time, a pointer to the new element is stored in the second element's first field 54. The removal of the memory barrier instruction allows the address of the second element to be computed 52 at the same time as storing a pointer to the new element in the second element's first field 54. The removal of the memory barrier instruction increases the efficiency of operation of the program. However, there may temporarily be corrupted data in the new element. Accordingly, there is a need for an efficient pipelining model that maintains data integrity while improving operating efficiency.

One programming model that allows a more efficient implementation is synchronization. A program is synchronized if all access to shared data is ordered by synchronized operations. In addition to synchronizing programs, there is also a need to define the ordering of memory operations. There are two types of restrictions on memory orders, write barriers and read barriers. In general, barriers act as boundaries, forcing the processor to order read operations and write operations with respect to the barrier. Barriers are fixed points in a computation that ensure that no read operation or write operation is moved across the barrier. For example, a write barrier executed by a processor A ensures that all write operations by A prior to the write barrier operation have completed, and no write operations that occur after the write barrier in A are initiated before the barrier operation. In sequential consistency, all read operations are read barriers, and all write operations are write barriers. This limits the ability of the hardware to optimize accesses, since order must be strictly maintained. The typical effect of a write barrier is to cause the program execution to stall until all outstanding writes have completed, including the delivery of any associated invalidations.

In an attempt to increase performance, it has become known to reorder execution of instructions. However, in reordering instructions special synchronizing instructions are required in order to specify to the CPU which accesses may not be reordered. Accordingly, there is a need for a computer system comprising multiple processors for maximizing CPU performance by placing constraints on shared memory access while removing constraints on non-shared memory accesses.

SUMMARY OF THE INVENTION

It is therefore an object of the invention to provide a method of maximizing CPU performance in a multiprocessor computer system. It is a further object of the invention to allow local memory operations to execute in an arbitrary order while providing constraints for shared memory operations.

In one aspect of the invention, a processor is provided for use in a multiprocessor computer system which includes instructions for ordering operating constraints within a computer processing system. First, second, and third sets of instructions are provided. The third instruction set is a manager to ensure the system maintains order of execution between the first and second sets of instructions, and that the first instruction set reach a specified state of execution before the second instruction set reaches a specified state of execution. The specified state of the first and second instruction is preferably, but not necessarily, selected from the group consisting of: committing instruction execution, initiating memory access, completing a memory access, initiating an I/O access, completing an I/O access, and completing instruction execution.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1$b$ is a block diagram of a prior art data structure with a new element initialized.

FIG. 1$c$ is a block diagram of a prior art data structure with a new element appended to a list.

DESCRIPTION OF THE PREFERRED EMBODIMENT

Overview

In a shared memory multiprocessor system it is essential that multiple processors see a consistent view of memory. CPUs that use a weak memory consistency model generally use memory barrier instructions to force the order of write operations. However, memory barrier instructions place constraints on the order of memory writes performed by all instructions. These constraints place artificial limits on the amount of performance increase that a CPU may attain by reordering operations. In many algorithms, there are local memory operations that may be ordered arbitrarily wherein only certain global memory access operations need be carefully ordered. Accordingly, it is desirable and efficient to implement a method that allows selected write operations to global memory to be properly ordered, while allowing a CPU full freedom to reorder local write operations as needed to optimize CPU performance.

Technical Details

In general, neither the CPU nor the compiler can distinguish between local and global memory operations. Nor can the CPU or the compiler determine which global memory operation access must be ordered. It is therefore necessary for the programmer to indicate the ordering by use of special compiler directives which would cause the compiler to insert special assembly language instructions. Such instructions explicitly indicate which write operations are to be placed in a specific order of operation and which write operations may occur arbitrarily.

Figure 1A:
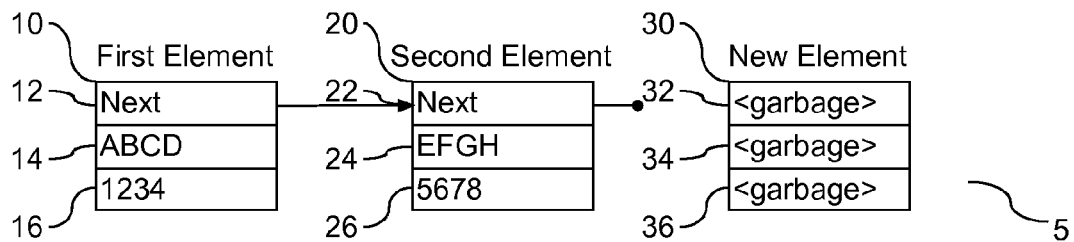
FIG. 1$a$ is a block diagram of a prior art data structure at an initial state.
Figure 1B:
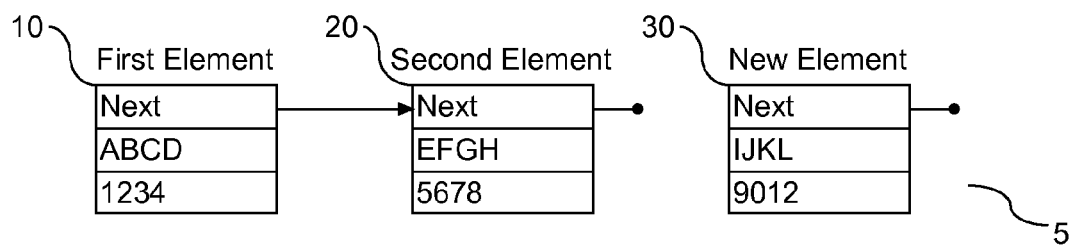
Figure 1C:
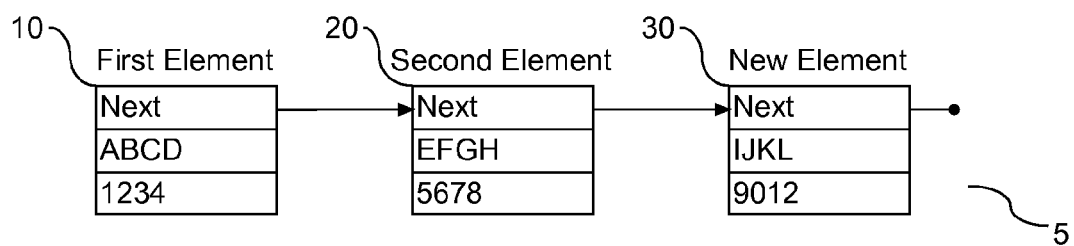
Figure 2:
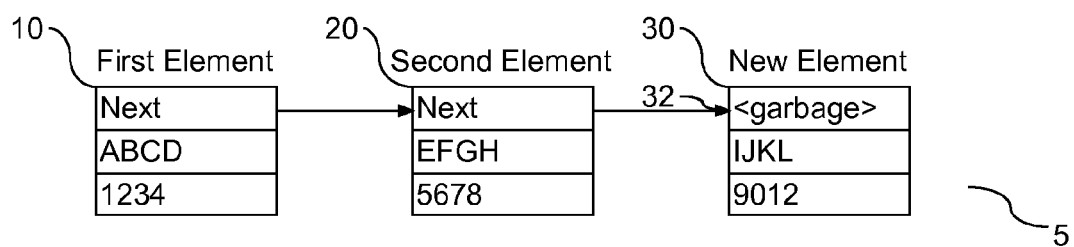
FIG. 2 is a block diagram of a prior art data structure of a weak memory-consistency model.
Figure 3:
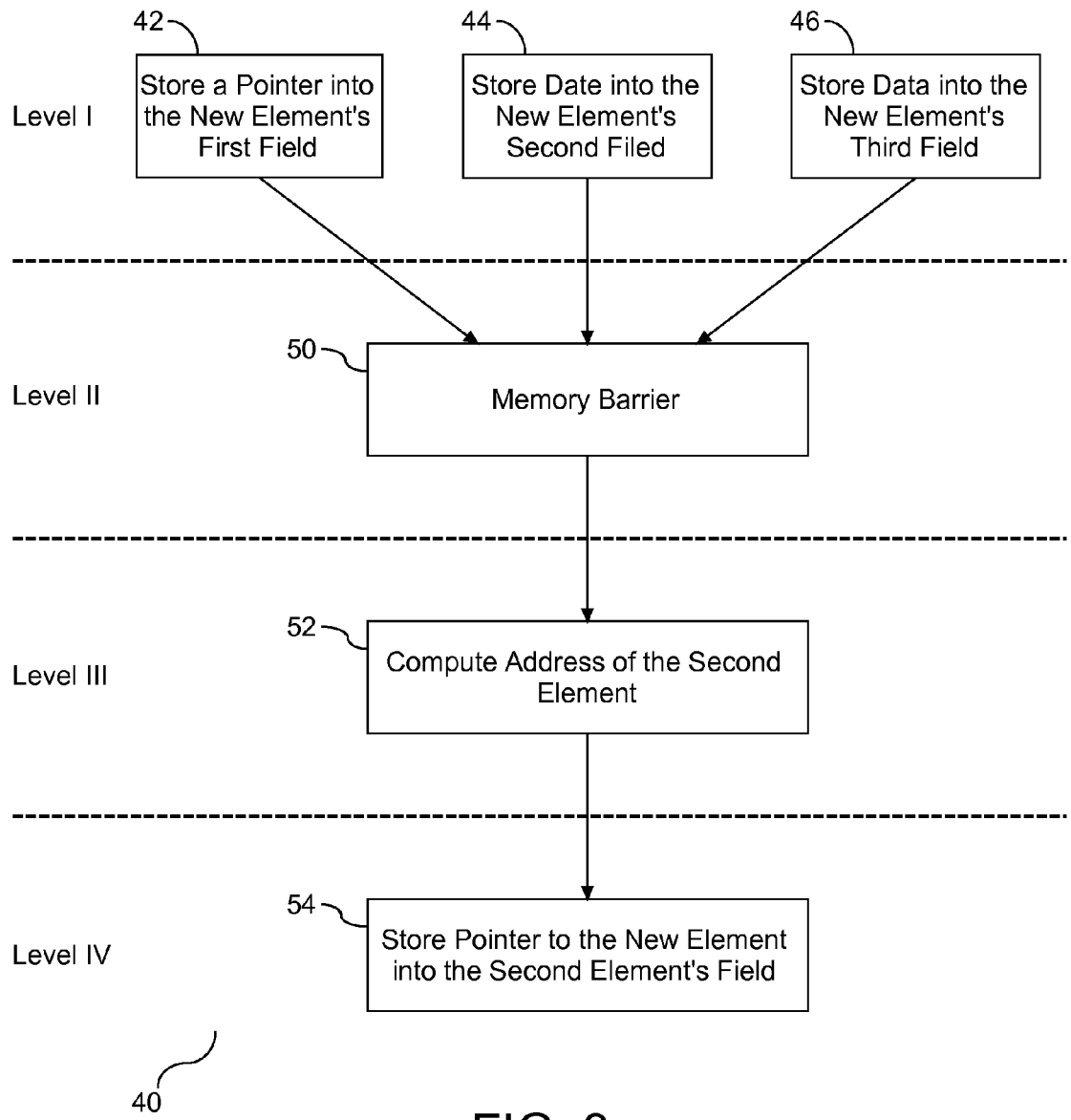
FIG. 3 is a prior art block diagram illustrating use of a memory barrier for appending a data structure.
Figure 4:
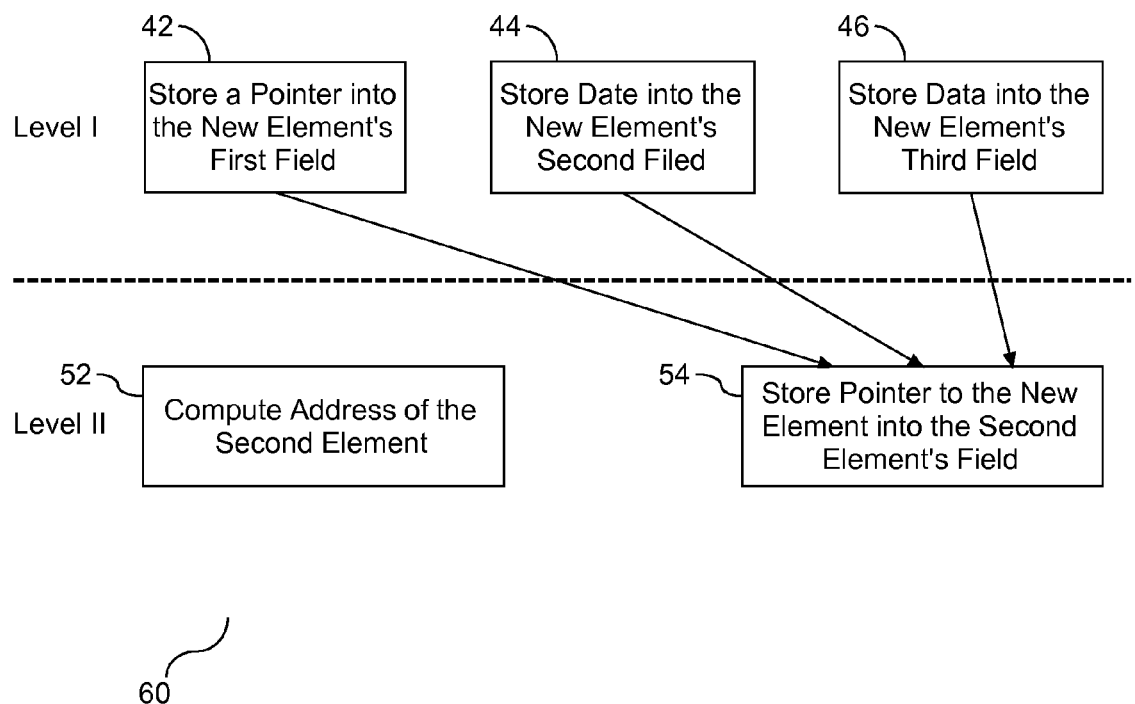
FIG. 4 is a prior art block diagram illustrating appending a data structure without a memory barrier.
Figure 5:
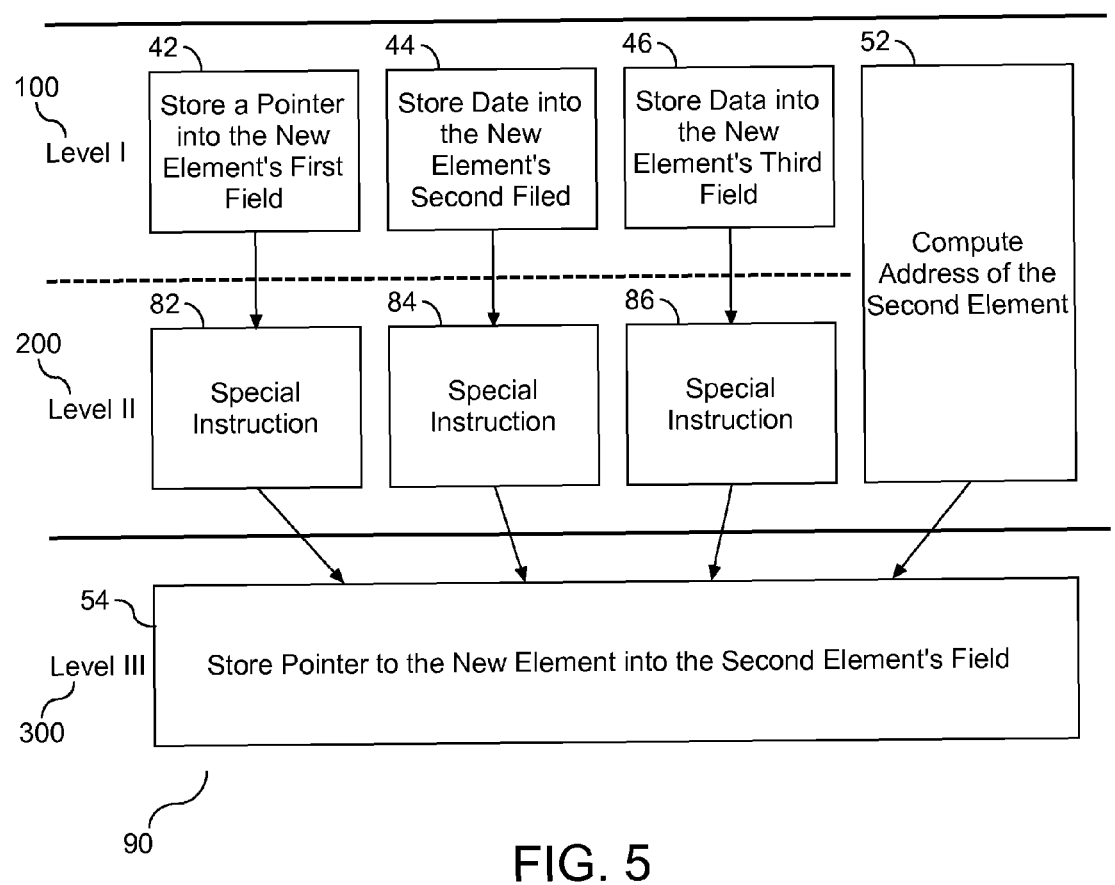
FIG. 5 is a block diagram illustrating appending a data structure with implementation of special instructions according to the preferred embodiment of this invention, and is suggested for printing on the first page of the issued patent.

FIG. 5 refers to a block diagram 90 of the process of ordering global memory operations. This process provides for a CPU to explicitly indicate which write operations are to be specifically ordered, while allowing the remainder of the write operations to occur at any time. The flow diagram illustrates the ordering of global memory operations. Similar to the block diagram of FIGS. 3 and 4 and the data structure list example of FIGS. 1 and 2, this model maintains an ordering of the processes prior to linking the new element 30 to the second element 20 of the data structure 5. As shown in FIG. 5, the process of writing to each of the fields in the new element may occur at any time prior to storing a pointer from the second element 20 to the new element 30. Step 42 references the process of conducting a write operation to the first field of the new element, step 44 references the process of conducting a write operation of the second field of the new element, and step 46 references the process of conducting a write operation to the third field of the new element. Each of the write operations is monitored by a special instruction 82, 84 and 86, respectively. The independent special instruction associated with each write operation forces the write operation to precede step 54, which is the process of storing a pointer to the new element in the second element's first field 22. In conjunction with the write operation steps 42, 44, and 46, and the associated special instructions 82, 84, and 86, this preferred embodiment allows the local memory operations 52 to occur at any time prior to the process of storing a pointer to the new element in the second element's first field 54. As shown in FIG. 5, the local memory operation may occur in conjunction with the memory write operations 42, 44, and 46 or the special instruction operations 82, 84 and 86. Accordingly, the implementation of the special instructions in conjunction with the removal of the memory barrier that was shown in FIG. 4, explicitly indicates which write operations are to be conducted in a specified order and which write operations may be conducted in an arbitrary order.

Pseudocode for the special instructions that explicitly indicates which write operations are to be executed in a specific order is as follows:
1. Store a NULL pointer into the new element's first field.
2. Store the character string "IJKL" into the new element's second field.
3. Store the number 9012 into the new element's third field.
4. Execute a special instruction that forces the write in step 1 to precede that in step 8.
5. Execute a special instruction that forces the write in step 2 to precede that in step 8.
6. Execute a special instruction that forces the write in step 2 to precede that in step 8.
7. Compute the address of the second element (which could involve many write operations to local memory).
8. Store a pointer to the new element into the second element's first field.

The pseudocode outlined above demonstrates a process that allows any local memory write operations to proceed at any time, i.e. either before, during or after the process of storing data in the fields of the data structure, but prior to the process of storing a pointer from the existing data structure to the new data structure element. Accordingly, the flexibility of allowing local memory write operation to proceed at any time prior to the process of establishing a pointer to the new element of the data structure provides the CPU the freedom to optimize use of its internal resources.

Furthermore, as is shown in FIG. 5, there are essentially three levels of operation that occur in linking the new element 30 to the second element 20. The first level 100 is the write operations to each of the respective fields of the new element 30. The second level 200 is the special instruction associated with each of the write operations. The third level 300 is the process of storing a pointer to the new element 30 into the second element's first field 22. The local memory operations, as referenced by 52, may occur in conjunction with the processes in the first level 100 or the second level 200. Accordingly, the implementation of the special instructions in conjunction with removal of the memory barrier illustrated in FIG. 3 actually speeds up the process of adding the new element while maintaining the integrity of the data.

There are several methods of designing instructions to order global memory operations as shown in FIG. 5. One method is to set aside a pair of registers of a CPU for assigning address instructions. The register is resident in a CPU and an external CPU cannot access the registers of another CPU. The first register contains a first instruction address. The second register contains a second instruction address. The execution of a special third instruction will reference the instructions indicated by the first and second registers. The third instruction specifies ordering between the first and second instructions. The remainder of the instructions that are not referenced in the registers can occur at any time during the execution of the write operations. In general, the global memory operations are the instructions that are referenced in the registers. The third instruction ensures that the first instruction's execution reach a predefined state prior to the execution of the second instruction reaching a predefined state. Examples of the predefined state are: committing instruction execution, initiating a memory access, completing a memory access, initiating an I/O access, completing an I/O access, and completing instruction execution. Both the first and second instruction may have the same predefined state, or the states may be separately defined for the different instructions or for different groups of the instructions. Accordingly, the assignment of instruction addresses into a pair of registers is just one embodiment of how the process of the preferred embodiment may be implemented.

Another method of implementing the process of the preferred embodiment is to control the order in which memory write operations are flushed from the write buffer. Each write buffer entry is assigned a sequence number for identifying the sensitivity of the entry. The sequence number indicates the order in which entries must be flushed to memory. Alternatively, the sequence number may indicate that the corresponding entry may be flushed to memory at any time and is not order dependent. The hardware that flushes the write buffer would then have the information required to flush the buffers in the hierarchical ordering provided. As in the case of registers, an external CPU cannot see the write buffer. The following table illustrates the appearance of a CPU's write buffer in conjunction with the eight step pseudocode of the preferred embodiment:

| Address | Data | Sequence |
| --- | --- | --- |
| First field of new element | NULL pointer | 1 |
| Second field of new element | "IJKL" | 1 |
| Third field of new element | 9012 | 1 |
| Local variables used to compute address of second element | Local stack address | Don't Care |
| Another local variable | Local stack address | Don't Care |
| First field of second element | Pointer to new element | 2 |

The "don't care" values are associated with local memory operations, and allows the CPU to optimize performance. Alternatively, the "don't care" values may be indicative that the associated instruction is not sensitive to order of execution, and that conducting the associated operation out of order will not affect the integrity of the associated data. The filling out of the data structure can occur at any time prior to the establishment of a pointer to the new element of the data structure. The remainder of the processes are conducted in numerical order governed by the associated sequence number.

In a further embodiment of the invention, the sequence numbers may be provided statically, wherein the sequence numbers are encoded directly into the instruction. Alternatively, the sequence numbers may be dynamically encoded. An example of dynamically encoding sequence number is to read the instruction sequence numbers out of the CPU registers. Accordingly, the alternative method of providing sequence numbers for the associated instructions may provide a more efficient performance since the order of operation of the instructions may be adapted to different circumstances.

Another example of implementing instructions indicating specificity of order of global memory operations is to place a range of instructions into a hierarchical ordering system. In this format, a range of instructions are placed into a group, and multiple other instructions or a range of instructions may be placed into other groups. A special instruction is implemented to ensure that the hierarchical ordering of the groups is maintained. This ensures that the integrity of the data written to the data structure is not temporarily corrupted.

The pseudocode for the placement of a range of instructions into a hierarchical ordering system is as follows:
1. Store a NULL pointer into the new element's first field.
2. Store the character string "IJKL" into the new element's second field.
3. Store the number 9012 into the new element's third field.
4. Execute a special instruction that groups the write operations in steps 1, 2 and 3.
5. Execute a special instruction that forces the write operations in the group indicated by Step 4 to precede that in Step 7.
6. Compute the address of the second element (which could involve many write operations to local memory).
7. Store a pointer to the new element into the second element's first field.

The hierarchical ordering system is advantageous where elements with many field are being inserted into a list while allowing concurrent readers. Accordingly, the hierarchical ordering system provides for a special instruction to place multiple write operations into a grouping, wherein another instruction indicates order of operation of assigned groupings.

Alternative Embodiments

It will be appreciated that, although specific embodiments of the invention have been described herein for purposes of illustration, various modifications may be made without departing from the spirit and scope of the invention. In particular, a second embodiment is a microprocessor for use in a multiprocessor computer system. The microprocessor contains registers and instructions as described above, implemented using well known skills in creating instruction sets and register assignments for processors. More specifically, a first instruction is provided to allow local memory operations to occur in an arbitrary order, and a second instruction is provided to place constraints on shared memory operations. The first instruction is indicative of the absence of an instruction for local memory operations. A third instruction is provided to manage the order of execution of the first and second instructions. Execution of the second instruction is responsive to the first instruction reaching a specified state of execution. Examples of the state of execution are: committing instruction execution, initiating an I/O access, completing an I/O access, and completing an instruction execution. There are several alternative components used in implementing the hierarchical ordering of instructions, including storing the first and second instructions on separate registers resident in a CPU, assigning sequence numbers to the instructions for specifying the order of execution, and implementing a manager to place a range of instructions in a hierarchical order. Accordingly, the scope of protection of this invention is limited only by the following claims and their equivalents.

I claim:

1. A computer system comprising:
   multiple processors with a shared memory resource accessible by all processors, and non-shared memory local to a processor;
   data elements organized and stored in said shared memory resource designed to support data manipulation functions; and
   compiler directives to indicate an order of operation execution, the directives comprising:
      a first instruction in communication with said processor to execute write operations in memory local to said processor in an arbitrary order;
      a second instruction in communication with said processor and said shared memory resource to indicate a set of write operations to said shared memory resource to be conducted in a specified order; and
      a special instruction in communication with said processor and said shared resource to force execution of said write operations to said shared memory resource to precede storage of a pointer from an existing element of said shared resource to a new element of said shared resource, wherein said pointer is stored in said shared resource.

2. The system of claim 1, further comprising a first register to store a first instruction address and a second register to store a second instruction address.

3. The system of claim 2, further comprising a third instruction to manage order of execution of said first and second instructions.

4. The system of claim 3, wherein execution of said second instruction is responsive to said first instruction reaching a specified state of execution.

5. The system of claim 4, wherein said specified state of execution is selected from the group consisting of: committing instruction execution, initiating memory access, completing a memory access, initiating an I/O access, completing an I/O access, and completing instruction execution.

6. The system of claim 1, wherein said first and second instructions are assigned a sequence number to specify an order of instruction execution.

7. The system of claim 6, wherein said sequence number is statically encoded within said instruction.

8. The system of claim 6, wherein said sequence number is dynamically encoded within said instruction.

9. The system of claim 1, further comprising a manager to place a range of instructions in a hierarchical order.

10. The system of claim 8, further comprising a special instruction to maintain execution of said instruction in said hierarchical order.

11. A computer system, comprising:
    multiple processors with a shared memory resource accessible by all processors, and non-shared memory local to a processor;
    data elements organized in said shared memory resource designed to support data manipulation functions; and
    compiler directives to indicate an order of operation execution, the directives comprising:

a first instruction in communication with said processor to allow write operations in non-shared memory local to said processor to occur in an arbitrary order;

a second instruction in communication with said processor and said shared memory resource to indicate a set of write operations to said shared memory resource to be conducted in a specified order, wherein write operations to said shared memory resource must execute prior to storage of a pointer from an existing element of said shared memory resource into a new element of said shared memory resource; and a third instruction in communication with said processor and said shared memory resource to manage order of execution of said first and second instructions;

wherein execution of said second instruction is responsive to said first instruction reaching a specified state of execution and said specified state of execution is selected from the group consisting of: committing instruction execution, initiating memory access, completing a memory access, initiating an I/O access, completing an I/O access, and completing instruction execution.

12. The system of claim 11, a first register to store a first instruction address and a second register to store a second instruction address.

13. The system of claim 11, wherein said first and second instructions are assigned a sequence number to specify an order of instruction execution.

14. The system of claim 11, further comprising a special instruction in communication with said processor and said shared resource to maintain execution of said instructions in said hierarchical order.

* * * * *